April 16, 1957 P. M. HENKES 2,788,946
MOTOR MOUNTING

Filed Sept. 11, 1953 3 Sheets-Sheet 1

INVENTOR:
Peter M. Henkes
BY Peck + Peck
ATTORNEYS.

April 16, 1957 P. M. HENKES 2,788,946
MOTOR MOUNTING
Filed Sept. 11, 1953 3 Sheets-Sheet 2

INVENTOR:
Peter M. Henkes
BY
Peck + Peck
ATTORNEYS.

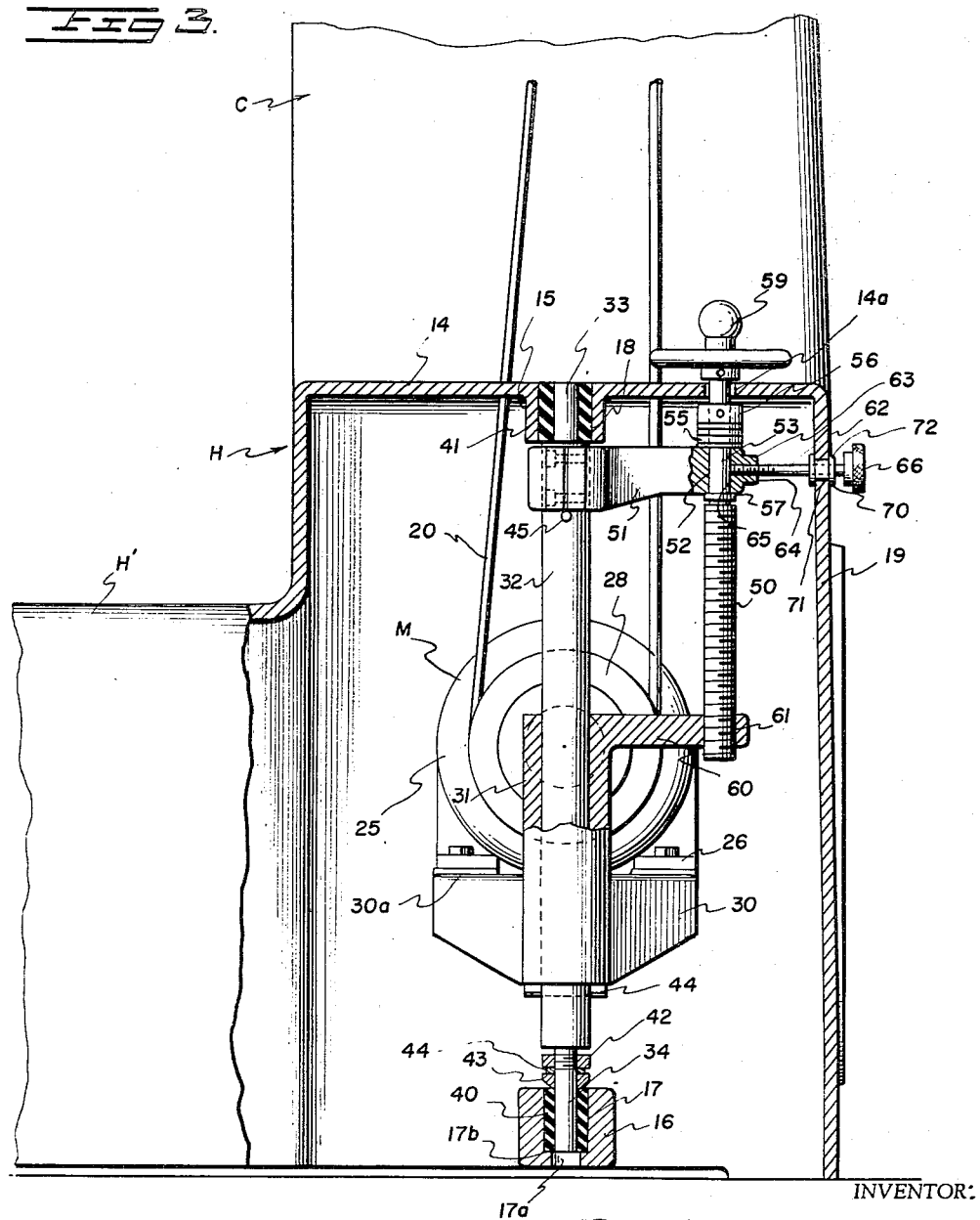

United States Patent Office 2,788,946
Patented Apr. 16, 1957

2,788,946

MOTOR MOUNTING

Peter M. Henkes, Racine, Wis., assignor to George Gorton Machine Co., Racine, Wis., a corporation of Wisconsin Application September 11, 1953, Serial No. 379,529

1 Claim. (Cl. 248—16)

The invention is directed and relates to a motor mounting for the motors of power drives to the cutter spindles of machine tools and particularly to such a motor mounting in engraving and the like vibration sensitive machines; and the nature and objects of the invention will be readily recognized and understood by those skilled in the art in the light of the following explanation and detailed description of the accompanying drawings illustrating one possible embodiment and mechanical expression of the invention in an adaptation thereof to a particular type of machine, from among various other embodiments, expressions, adaptations, forms, constructions and combinations of which the invention is capable within the broad spirit and scope thereof as defined by the claim hereto appended.

In various types of engraving and reproducing machines in which a pattern or master is reproduced on a workpiece by a rotary cutter or engraving tool mounted on a rotary spindle, a motor driven power drive is provided for rotating the cutter spindle, usually at a high rate of speed of rotation, with the motor for such drive being mounted on or in the machine. In the use of such machines the precision and perfection of the engraving or reproduction performed by the machine on the workpiece is sensitive to and impaired by vibrations which may be transmitted to the machine frame structure and operating components from the motor for the cutter spindle drive. And this problem of vibration and the effects thereof on the quality of work production may be particularly encountered in those types of machines in which the power drive from the motor to a cutter spindle is of the belt and single or multiple step pulley type requiring that the position of the motor be shifted or adjusted for proper tensioning of the belts or in order to permit of the use of different size pulleys or different combinations of steps of multiple step driving and driven pulleys, for different rates of speed of rotation of the cutter spindle to be driven thereby from the motor.

It is one of the primary objects of my invention to provide a mounting for the motor of a power drive in a machine tool organization by which a minimum of vibration will be transmitted thereby from the motor and drive to the machine organization.

Another object is to provide such a motor mounting capable of ready accurate adjustment to shift the motor bodily to various selected positions of operation with minimum transmission of vibration therefrom in any selected position to which adjusted.

A further object is to provide such an adjustable motor mounting with a manually operable adjusting mechanism of mechanical and structural simplicity capable of ready adaption to and embodiment in various types and designs of machine organizations requiring a motor drive.

Another object is to provide a manually adjustable motor mounting for the cutter spindle or other power driven member in a machine tool which includes a mechanically simple lock mechanism for releasably securing the motor mounting and motor thereon in any position of adjustment.

And a further object is to provide a design and arrangement of adjustable motor mounting and manually operable adjusting mechanism and releasable locking mechanism in which the manual controls for the adjusting mechanism and the locking mechanism are such that they may be located in a machine organization in positions convenient and readily accessible to an operator.

With the foregoing and various other objects, features and results in view which will be readily apparent from the following detailed description and explanation, my invention consists in certain novel features in design and construction of parts and components and in combinations and sub-combinations thereof, all as will be more fully specified and referred to hereinafter.

Referring to the accompanying drawings in which similar reference characters refer to corresponding parts throughout the several figures thereof:

Fig. 3 is a view in vertical section through the sub-base of the supporting frame structure showing the motor and adjustable mounting therefor in elevation from an outer side of the machine.

A precision engraving machine of the 3-dimensional type having a power driven cutter spindle has been selected as an example for the purpose of explaining my invention and its several features because the problem of the effects of vibration on the work performed with such type of machine is met with in a high degree and has been successfully met in operation and use by my present invention. The machine of the selected example is of a well-known type in wide commercial use and is exemplified as to type and functioning by the disclosures of the U. S. Patents Nos. 2,128,611 and 2,161,709, issued to me as patentee on August 30, 1938, and June 6, 1939, respectively. However, by the selection of this specific machine of this type it is not desired or intended to limit the use of the adjustable, minimum-vibration, motor mounting of my invention thereto, as it will be clear to those skilled in this art that the invention is capable of general application to machine organizations presenting broadly equivalent problems, or where it may be desired to utilize an adjustable motor mounting to eliminate or reduce transmission of motor vibrations from the mounting to the machine organization and its components, or where it may be found expedient to utilize an adjustable motor mounting of simple mechanical and structural arrangement which can be readily located and incorporated in a machine organization.

Figure 1:
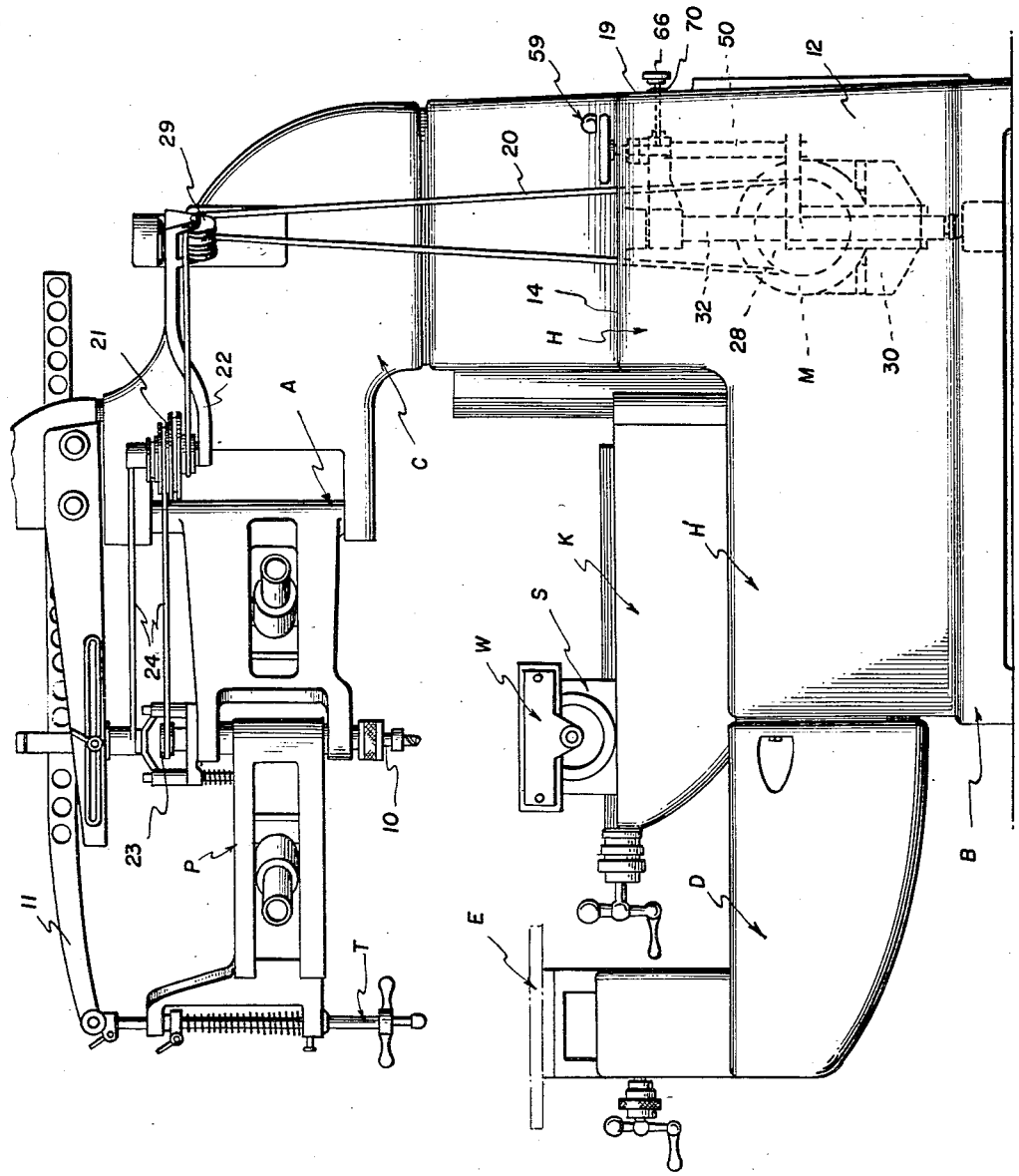
Fig. 1 is a view in side elevation of an engraving machine of the 3-dimensional type embodying and including an adjustable motor mounting of my invention for the motor of the belt drive for the cutter spindle of the machine.
Figure 2:
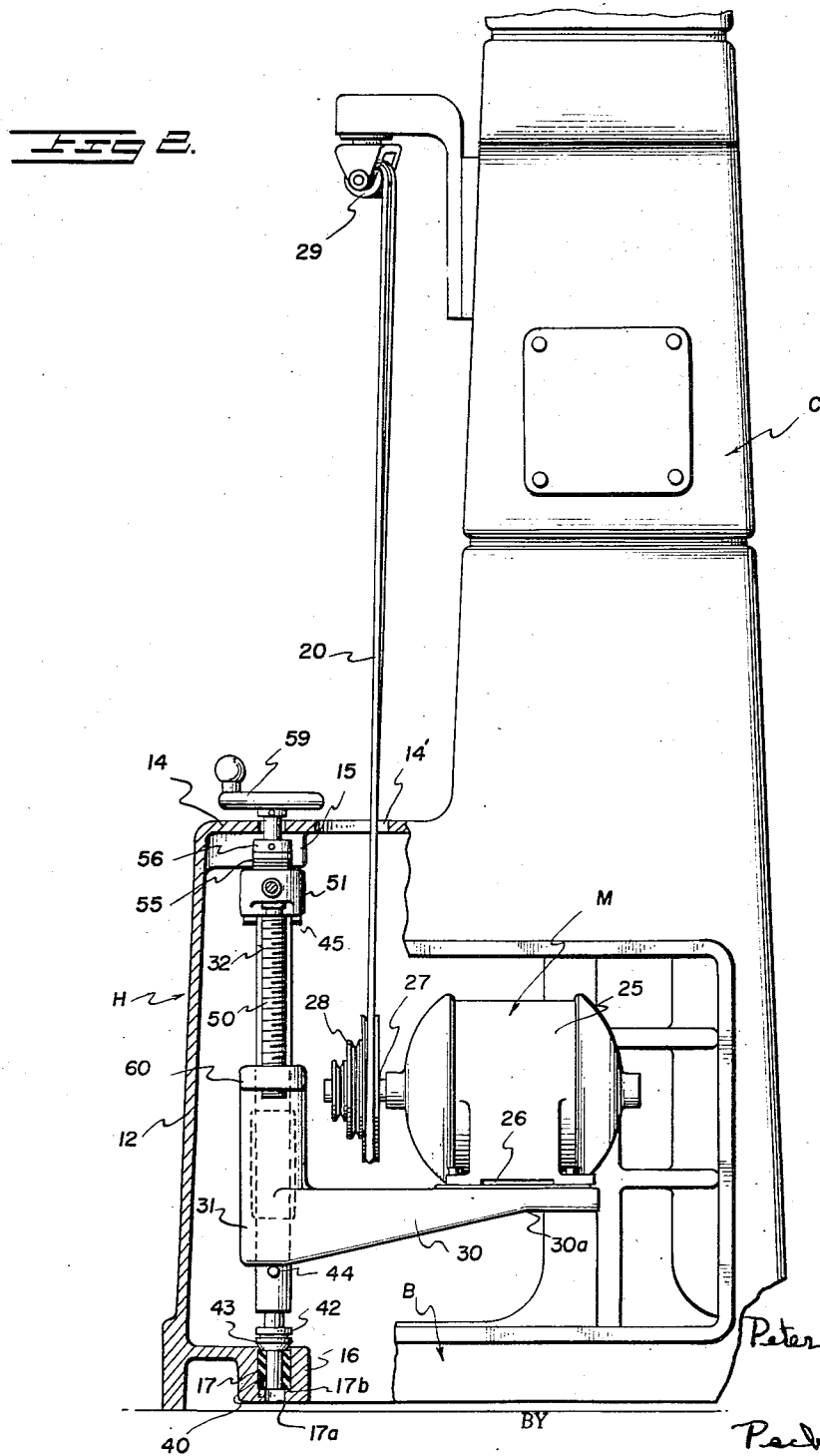
Fig. 2 is a view partly in rear elevation of and partly in vertical section through the supporting frame structure of the machine of Fig. 1, showing the motor and the adjustable mounting therefor in elevation from the rear side of the machine.

The 3-dimensional engraving machine of the selected example is illustrated in Fig. 1, and includes a supporting frame structure for the various operational components thereof which comprises a main base B having at one side of the rear portion thereof a vertically disposed, hollow column C which pivotally mounts at the forward upper portion thereof a pantograph component or linkage P for swinging in a horizontal plane about a vertical pivot mounting A on the column C. A vertically adjustable knee K is mounted in the more or less conventional manner at the forward side of column C, and a saddle S is slidably mounted on knee K for movements along a straight line path toward and from column C. A work table W is slidably mounted on saddle S for movements thereon along a straight line path perpendicular to the path of movements of saddle S on knee K. The work table W is positioned by saddle S beneath the pantograph component P. The column C includes integrally therewith in this instance, a housing H extending laterally from the lower portion thereof at the inner side of the column and across base B. The housing H is also integral with the base B. A sub-base H′ integral with the housing H and with the base B extends horizontally and forwardly on and across the base to the front end or side thereof. At the forward end of this sub-base H′ there is mounted and attached rigidly thereto a forwardly extending copy table supporting arm unit D on the upper end of which there is mounted the horizontally disposed copy table E.

The pantograph component P mounts and includes a vertically disposed cutter spindle 10 positioned thereon above the work table W and being mounted for vertical axial movements upwardly and downwardly relative to the pantograph component and the work table. A tracer spindle T is mounted on pantograph component P for vertical axial movements upwardly and downwardly relative thereto. Tracer spindle T is positioned by the pantograph component P above copy table E. A so-called modelling bar 11 is mounted on the upper end of column C for vertical swinging upwardly and downwardly about a horizontal axis and for lateral swinging in either direction through a horizontal plane about a vertical axis. This modelling bar 11 extends horizontally forwardly and outwardly over and in the vertical plane of the upper ends of the cutter spindle 10 and the tracer spindle T, with these spindles being pivotally coupled to and linked with the modelling bar for vertical movements by vertical, upward and downward swinging of the bar.

The cutter spindle 10 is journaled on the pantograph component P for high speed rotation as it is moved universally laterally by the pantograph component P and upwardly and downwardly by the modelling bar 11, in scaled reproduction of the lateral and vertical movements of the tracing spindle T as the tracing spindle is moved by the operator over the profile and contours of a pattern or master (not shown) on the copy table E. The cutter spindle 10 is power driven from a motor M through the medium of a belt drive which in this example is comprised by an endless belt 20 in driving engagement with a multiple step pulley 21 mounted for rotation about a vertical axis on a horizontally disposed arm 22 swingably mounted on column C. The upper end of cutter spindle 10 mounts thereon a driving pulley 23 which is placed in driven connection with motor driven pulley 21 by a belt 24. The motor M may be of any conventional or standard type and includes a motor housing 25 provided with the mounting base 26 and the armature or driving shaft 27 having fixed thereon for rotation therewith the multiple step driving pulley 28. The motor M in this example is mounted within the lower end of the hollow column C in position with the motor shaft 27 disposed horizontally and transversely of the column and housing H and the motor pulley 28 located in the housing H spaced a distance inwardly from the outer side wall 12 of that housing. The belt drive which is powered by the motor M is made up of the endless belt 20 engaged in a selected step of the motor pulley 28 and extended vertically upwardly from that pulley through a suitable opening in the top wall 14 of housing H, over a set of idler pulleys 29 mounted at the iner end of arm 22, and from such idler pulleys is extended to a selected step of the multiple step pulley 21 on arm 22. The belt drive is completed by the endless belt 24 on and extending between a selected step of pulley 21 and the spindle pulley 23, to thereby place the cutter spindle 10 in driven relation with motor M.

In accordance with my invention I provide a vertically adjustable mounting for the motor M together with a manually operable adjusting mechanism therefor by which the motor M may be adjusted bodily vertically upwardly or downwardly to selected positions of adjustment and then releasably locked in any adjustable position. And further, I so design and mount such adjustable motor mounting and its adjusting mechanism that the transmission of vibrations from the motor and drive to the supporting frame structure consisting of the base B, column C, housing H, sub-base H′, copy table supporting arm unit D and knee K, and to the operating components of the machine mounted and supported thereon, is eliminated or reduced to a minimum. In carrying out and expressing the invention by the example embodiment as incorporated in the particular type of engraving machine hereof, I provide a horizontally disposed motor mounting platform 30 which may be integral with a bracket or body member 31 vertically slidably mounted on a fixed, stationary shaft or post 32 mounted in vertical position in the housing H.

The shaft or post 32 may, as in this example, be of circular cross section and mounted in vertical position within the housing H spaced inwardly a distance from the outer side wall 12 thereof. The vertical, fixed shaft 32 extends between the base B and a vertical mounting boss 15 cast integral with and depending from the underside of the top wall 14 of the housing H. A mounting boss or socket 16 is formed in the base B in vertical alignment with the mounting boss 15 at the underside of housing top wall 14. The boss 16 is provided with a vertical bore 17 therethrough which at the lower end portion thereof at the underside of the boss is formed with the reduced diameter bore 17a to provide a seating shoulder 17b around the lower end of bore 17. The mounting boss 15 at the underside of top wall 14 is provided with a vertical bore 18 therethrough which is in precise vertical axial alignment with the bore 17 of the mounting boss 16 in base B.

The shaft or post 32 is mounted in fixed position extending vertically through housing H with its opposite upper and lower ends 33 and 34 being formed of reduced external diameter and mounted and fixed in the vertically aligned bores 18 and 17, respectively, of the bosses 15 and 16 on the top wall 14 of housing H and the base B below that top wall. As the shaft or post 32 mounts and slidably receives and supports thereon the bracket 31 and the motor mounting platform 30, I have provided a vibration-insulating mounting for the ends of the shaft in the bores of the mounting bosses 15 and 16 by which a minimum of vibration will be transmitted from the motor mounting to base B, housing H and column C. This vibration-insulating mounting is effected in the present example by providing a bushing 40 formed of rubber, rubber composition or the like resilient and vibration-absorbing material, in the bore 17 of the mounting boss 16 on base B with the lower end of this bushing being seated on the shoulder 17b formed at the inner end of bore 17. The bushing 40 is tightly fitted into bore 17. A generally similar vibration-absorbing bushing 41 is mounted and tightly fitted into the bore 18 of the mounting boss 15 at the underside of the top wall 14 of housing H. The shaft or post 32 is mounted in fixed, assembled position with the reduced diameter upper end 33 thereof extending into and tightly received in the vibration-absorbing bushing 41 in the upper mounting boss 15 and with the lower reduced diameter end 34 thereof extended into and tightly received in the vibration-absorbing bushing 40 in the lower mounting boss 16 of the base B. Preferably the assembled position of the shaft 32 is insured against axial displacement or play of the shaft between bushings 40 and 41, by threading a lock nut 42 on the reduced diameter end portion 34 of the shaft and interposing between that lock nut and the upper end of the bushing 40, a clamping or securing member 43 slidable on shaft end 34. A suitable washer 44 may be interposed between lock nut 42 and the clamping member 43, if desired. Thus, by threading nut 42 downwardly clamping member 43 will be forced into tightened position against the upper end of bushing 40 and between that bushing and the lock nut which is threaded on the shaft, and by positively limiting upward movement of the shaft at the upper end bushing 41, as will be described hereinafter, the shaft 32 may be fixed in mounted position against vertical axial play.

The motor mounting platform 30 which is carried by and in this instance is integral with bracket 31, extends horizontally inwardly from the housing H toward and into the colum C. This platform 30 provides an upper horizontal seating surface 30a onto which the motor M may be securely attached in any suitable manner in position thereon with the axis of the motor shaft 27 substantially perpendicular to the axis of the shaft 32 and lying in a vertical plane passing through the axis of the shaft. With the motor M so positioned the pulley 28 on shaft 27 is located between the outer end of the motor and the inner side of shaft 32. Thus, by displacing the bracket 31 upwardly or downwardly on the shaft 32 the platform 30 with motor M thereon may be raised or lowered as a unit to any desired operating position thereof within the range of vertical movements of bracket 31 on the shaft 32. A suitable transverse pin 44 through the shaft 32 adjacent but spaced above the lower reduced diameter end 34 of the shaft provides a stop against which bracket 31 engages to thereby determine the maximum lowered position to which the bracket platform 30 and motor M may be lowered on shaft 32. A similar pin 45 may be provided in shaft 32 adjacent the upper end thereof to determine the maximum raised position of the bracket 31, platform 30 and motor M mounted thereon, as well as to provide a positive stop preventing upward displacement of the shaft in its vibration absorbing mounting bushings 40 and 41, after clamping adjustment of the nut 42 at the lower end of shaft 32.

The invention provides a manually operable adjusting mechanism for selectively raising and lowering bracket 31 on the fixed and stationary shaft or post 32 to thereby selectively vertically position the motor M. Such adjusting mechanism in the example hereof includes an elevating feed screw 50 which is journaled and mounted in vertically disposed position on a horizontal support arm 51 secured and attached to the upper end of shaft 32 adjacent the upper end mounting boss 15 at the underside of top wall 14 of the housing H. This arm 51 is suitably attached, as by clamping means, to the shaft 32 between the underside of mounting boss 15 and the pin 45 in shaft 32. The arm 51 in mounted position extends horizontally outwardly from shaft 32 toward the rear wall 19 of the housing H with the outer end of the arm being spaced inwardly a distance from that wall. A vertical bore 52 is formed through arm 51 at the outer end thereof with its axis parallel with the axis of the fixed shaft or post 32. The elevating feed screw 50 has the upper end length 53 thereof formed with a truly cylindrical exterior surface therearound and this upper end length 53 is extended upwardly through and is rotatably received in the vertical bore 52 of the arm 51. An annular anti-friction bearing unit 55 is mounted on the upper side of arm 51 and receives therethrough and journals therein the upper end length 53 of the elevating feed screw 50. A lock collar 56 is fixed on the upper end length 53 of screw 50 at the outer side of bearing unit 55 with the bearing unit in assembled position being engaged between arm 51 and the lock collar. The screw 50 is provided with a flange 57 therearound at and engaged with the underside of arm 51. Thus the elevating screw is mounted in vertical position depending downwardly from arm 51 for rotation in either direction about a vertical axis. The length of the screw 50 from flange 57 to the lower end thereof is provided with external threading 58 thereon.

The upper end length 53 of the elevating screw 50 extends upwardly from arm 51 and the bearing unit 55, through an opening or bore 14a in the top wall 14 of the housing H. A manual operating knob 59 is fixed on the upper end of the smooth wall upper end length 53 of the elevating screw 50 for manual rotation in either direction to thereby correspondingly rotate the elevating screw 50 in the bearing unit 55. The manual operating knob 59 is thus located at the outer side of the top wall 14 of the housing H in a position which is readily accessible to an operator. It will be noted that the diameter of the bore 14a in wall 14 is greater than the diameter of the length 53 of screw 50, so that there is no vibration transmitting contact between screw 50 and wall 14.

The elevating screw 50 provides the actuating member for raising and lowering the bracket 31 to vertically, selectively adjust platform 30 and the motor M mounted thereon. In this particular embodiment of the invention the operative connection between the elevating screw 50 and the bracket 31 is carried out by providing an arm 60 on bracket 31 in position extending horizontally from the upper end of the bracket spaced a distance above motor mounting platform 30 toward the elevating screw 50 and the rear wall 19 of the housing H. An internally threaded bore 61 is provided through the arm 60 in position thereon adjacent the outer end thereof and in precise vertical axial alignment with the elevating screw 50. In assembly the elevating screw 50 is threaded downwardly through the internally threaded bore 61 of the arm 60 in permanent threaded engagement therewith, so that, with the screw 50 in fixed position vertically or axially and with the bracket 31 freely vertically movable on the stationary shaft 32, rotation of the elevating screw 50 in one direction will move bracket 31 upwardly while rotation of the elevating screw in the opposite direction will move the bracket downwardly. In this manner an operator by proper directional rotation of the operating knob 59 may selectively raise or lower bracket 31 and motor platform 30 the required linear distance to adjust the motor M on platform 30 to the desired operating position.

A releasable locking mechanism is provided by which an operator may, after adjusting the motor M to a selected operating position, then positively lock the motor in such selected position against inadvertent displacement therefrom. Such locking mechanism in this example is constituted by a locking spindle 62 rotatably mounted in and extending in horizontally disposed position through the rear wall 19 of housing H in line with the outer end of the elevating screw mounting arm 51. At the outer end of the arm 51 an outwardly extending boss 63 is provided and an internally threaded bore 64 is formed extending completely through the boss and arm to open at its inner end into the vertical, elevating screw receiving bore 52. The internally threaded bore 64 is horizontally disposed and positioned in axial alignment with the locking spindle 62. The inner end length of the locking spindle 62 is provided with external threading 65 thereon and the spindle is rotatably threaded into and through the bore 64 of arm 51 with the inner end of the locking spindle being adapted in locking position thereof to be tightly engaged against the smooth wall portion 53 of the elevating screw 50 to lock said screw against rotation in either direction. A manual operating knob 66 is mounted on the outer end of the locking spindle 62 for operator rotation of the locking spindle to thread that spindle inwardly to locking engagement with the elevating screw portion 53 and outwardly to position disengaged from and releasing elevating screw 50 for rotation.

In order to prevent or reduce to a minimum the transmission of motor generated vibrations from the locking spindle 62 to the wall 19 of housing H of the supporting frame structure of the machine, I rotatably mount the locking spindle 62 in a sleeve bushing or grommet 70 which is formed of rubber, rubber compositions or similar shock and vibration-absorbing character of materials. For instance, this vibration-absorbing grommet 70 is mounted and is tightly received and fitted in and extending through a bore 71 in the rear wall 19 of housing H with the locking spindle having a rotatable bearing fit therein and extending therethrough, as will be clear by reference to Fig. 3. The grommet 70 may, as in the example thereof here shown, be provided with opposite end, radially outwardly extended flanges 72 therearound which engage against the outer and inner surfaces of wall 19 around bore 71 to thereby maintain the grommet in assembled mounted position against displacement.

With the motor mounting incorporating the invention as expressed by the example embodiment, the operator may readily quickly adjust the vertical position upwardly or downwardly of the motor M, as may be required for belt tension or to accommodate pulleys of different sizes in the belt drive from the motor M to the rotary member of the machine driven therefrom, such as the cutter spindle 10 of the example machine, by rotating knob 59 to cause the elevating screw 50 to raise or lower bracket 31 carrying motor M on the mounting platform 30. After the motor M is moved to its position of adjustment, the locking spindle may be rotated by knob 66 to position positively engaged with and locking the elevating screw against rotation to thereby prevent inadvertent displacement of the motor from adjusted position.

With precision machines, such as the engraving machine of the example hereof, it is essential for maximum precision of work that vibration affecting the engraving operations be kept at a minimum. One of the major sources of vibration in a machine in which the cutting tool is power driven, is the motor for the cutting tool drive. By my present invention I have through the provision of the vibration-absorbing and insulating mountings 40, 41 and 70 at all points of contact between the motor mounting and its adjusting and locking mechanisms and the supporting frame structure of the machine, successfully reduced to a minimum the transmission of vibrations to the work performing components of the machine from the motor and its mounting mechanism. And it is to be particularly noted that the motor and the entire adjustable mounting therefor and operating and locking mechanisms thereof are completely mounted and enclosed within the hollow, integral column and housing extension thereof with only the operating knobs for the adjusting and locking mechanisms being exposed at the exterior of the housing. Due to the arrangement and combination of the housing, column and base of the supporting frame structure of the example machine, the belt drive from the motor within the housing to the machine cutter spindle has a substantial portion of the length of the belt from the motor enclosed within the housing extension of the machine column which housing provides a protective guard therefor.

It will also be evident that various other modifications, embodiments, variations, constructions, arrangements and combinations might be resorted to without departing from the broad spirit and scope of my invention, and hence I do not desire or intend to limit my invention in all respects to the exact and specific embodiment of the illustrated example hereof, except as may be required by specific and intended limitation thereto appearing in the claim hereto appended.

What I claim is:

In combination, a supporting frame structure including a lower wall, an upper wall spaced thereabove, and a vertically disposed side wall; a vertically disposed stationary shaft mounted with its opposite ends in said lower wall and in said upper wall, respectively; a motor mounting platform vertically slidably mounted on said stationary shaft extending radially outwardly therefrom; a fixed arm attached to and extending radially outwardly from said stationary shaft adjacent the upper end thereof; an elevating screw rotatably mounted in vertically fixed position in the outer end of said fixed arm and depending in vertically disposed position therefrom; said upper wall having an opening therethrough of greater internal diameter than the external diameter of said elevating screw; said elevating screw extending upwardly from said fixed arm through said opening in and completely out of engagement with said upper wall; an operating knob mounted in vertically fixed position on the upper end of said elevating screw at the exterior of and completely out of contact with said upper wall for rotating said elevating screw; said elevating screw being operatively connected with said motor mounting platform for raising and lowering the latter by rotation of said elevating screw; said vertically disposed side wall having an opening therethrough adjacent the upper end thereof; a locking spindle extending through said opening in said vertically disposed side wall and rotatably threaded into and through the outer end of said fixed arm on said stationary shaft for axial movement therethrough to and from locking engagement with said elevating screw; said opening in said side wall having a greater diameter than the external diameter of said locking spindle extending therethrough with said locking spindle completely out of direct contact with said vertically disposed side wall; and an operating knob on the outer end of said locking spindle at the exterior of, spaced from and completely out of contact with said side wall for selective manual rotation to rotate said locking spindle to and from locking engagement with said elevating screw.

References Cited in the file of this patent
UNITED STATES PATENTS

| | | |
|---|---|---|
| 1,040,576 | Pieper | Oct. 8, 1912 |
| 1,790,581 | Gorton et al. | Jan. 27, 1931 |
| 2,041,578 | Tautz | May 19, 1936 |
| 2,235,184 | Wettlaufer | Mar. 18, 1941 |
| 2,253,597 | Wyne | Aug. 26, 1941 |
| 2,291,999 | Wilson et al. | Aug. 4, 1942 |
| 2,471,120 | Pepin | May 24, 1949 |
| 2,643,626 | Morrill | June 30, 1953 |

FOREIGN PATENTS

| | | |
|---|---|---|
| 612,508 | Great Britain | Nov. 15, 1948 |